United States Patent
Shoavi et al.

(10) Patent No.: US 10,509,644 B2
(45) Date of Patent: Dec. 17, 2019

(54) METHOD AND SYSTEM FOR CONTROLLING INTEGRATED SOFTWARE COMPONENTS

(71) Applicant: SafeDK Mobile Ltd, Herzliya (IL)

(72) Inventors: Orly Shoavi, Herzeliya (IL); Ronnie Sela-Sternberg, Ramat Hasharon (IL); Maya Lapiner, Tel Aviv (IL)

(73) Assignee: SAFEDK MOBILE LTD, Herzliya (IL)

( * ) Notice: Subject to any disclaimer, the term of this patent is extended or adjusted under 35 U.S.C. 154(b) by 374 days.

(21) Appl. No.: 14/631,797

(22) Filed: Feb. 25, 2015

(65) Prior Publication Data
US 2016/0246594 A1    Aug. 25, 2016

(51) Int. Cl.
*G06F 9/44* (2018.01)
*G06F 8/71* (2018.01)
*H04W 4/18* (2009.01)
*G06F 8/65* (2018.01)
*G06F 21/54* (2013.01)
*G06F 9/445* (2018.01)

(52) U.S. Cl.
CPC .................. *G06F 8/71* (2013.01); *G06F 8/65* (2013.01); *G06F 9/44505* (2013.01); *G06F 21/54* (2013.01); *H04W 4/18* (2013.01)

(58) Field of Classification Search
None
See application file for complete search history.

(56) References Cited

U.S. PATENT DOCUMENTS

| | | | |
|---|---|---|---|
| 2003/0097596 A1* | 5/2003 | Muratov | G06F 21/31 726/26 |
| 2006/0215832 A1* | 9/2006 | Schwerk | G06F 17/30392 379/221.09 |
| 2007/0236453 A1* | 10/2007 | Maynard | G06F 17/2211 345/158 |
| 2008/0010233 A1* | 1/2008 | Sack | G06F 21/6227 |
| 2008/0301135 A1* | 12/2008 | Alves | G06F 17/30442 |
| 2009/0094667 A1* | 4/2009 | Habeck | G06F 21/6218 726/1 |
| 2013/0219307 A1* | 8/2013 | Raber | G06F 3/0484 715/763 |
| 2014/0032691 A1* | 1/2014 | Barton | H04L 41/00 709/206 |
| 2014/0082586 A1* | 3/2014 | Casey | G06F 8/20 717/104 |
| 2014/0129002 A1* | 5/2014 | Brandes | G05B 19/0426 700/83 |

(Continued)

*Primary Examiner* — David Le

(57) ABSTRACT

Method, system and product for controlling integrated software components. One method comprises receiving an application program which utilizes a software component that is integrated into the application program. The method further comprises producing a modified application program based on the application program, by: automatically wrapping one or more functions associated with the software component with one or more wrappers, wherein each wrapper is configured to selectively disable or enable invocation of the function based on modifiable configurations; whereby allowing for selectively enabling or disabling invocation of the one or more functions during runtime of the application program by modifying the modifiable configurations without re-deploying the application program.

21 Claims, 5 Drawing Sheets

(56) References Cited

U.S. PATENT DOCUMENTS

| | | | |
|---|---|---|---|
| 2014/0258986 A1* | 9/2014 | Wang | G06F 11/3684 717/126 |
| 2015/0332043 A1* | 11/2015 | Russello | G06F 11/30 726/23 |
| 2016/0188895 A1* | 6/2016 | Liu | G06F 21/6218 726/17 |

* cited by examiner

US 10,509,644 B2

METHOD AND SYSTEM FOR CONTROLLING INTEGRATED SOFTWARE COMPONENTS

TECHNICAL FIELD

The present disclosure relates to software integration in general, and to controlling integrated software components, in particular.

BACKGROUND

Mobile computing devices, such as advanced cellular telephones running a full fledged operating system, colloquially termed "smartphones", tablet computers, and the like, are becoming more and more ubiquitous and in widespread use.

Features of mobile computing devices typically include a multi-touch screen as the main form of user interaction, network connectivity and a variety of sensors, such as cameras, microphones, accelerometers, Global Positioning System (GPS) receivers, and the like.

In recent years, mobile computing devices are serving as an ever increasingly popular target platform for application programs development. Developers of application programs for mobile computing devices may conserve time and resources by using pre-existing software components providing certain desired functionalities, such as Software Development Kits (SDKs) currently available from multiple vendors.

BRIEF SUMMARY

One exemplary embodiment of the disclosed subject matter is a computer-implemented method comprising: receiving an application program for a mobile computing device, wherein the application program utilizes a software component that is integrated into the application program; producing a modified application program based on the application program, wherein said producing comprises: automatically wrapping one or more functions associated with the software component with one or more wrappers, wherein each wrapper is configured to selectively disable or enable invocation of the function based on modifiable configurations, wherein each wrapper is configured to define a substitute return value to mimic the return value of the function in case the invocation of the function is disabled, wherein each wrapper is configured to invoke the function in case the invocation of the function is enabled; whereby allowing for selectively enabling or disabling invocation of the one or more functions during runtime of the application program by modifying the modifiable configurations without re-deploying the application program. Additionally or alternatively, the modification is performed without requiring re-compilation of the application program.

Optionally, the software component is a Software Development Kit (SDK) provided by a different developer than the developer of the application program.

Optionally, the application program has permissions authorized by a user of the mobile computing device to access privileged data, wherein the permissions are enforced by the operating system of the mobile computing device, wherein the operating system enforces the permissions uniformly on the application program and the software component, wherein the software component is intended to utilize a portion of the permissions, wherein the wrapper is configured to allow disabling of the software component or portion thereof in case the software component utilizes more than the portion of the permissions.

Optionally, said automatically wrapping is configured to allow for selective full disablement of the software component, wherein the one or more functions are functions defined in an Application Program Interface (API) of the software component invoked by the application program when utilizing the software component, wherein the wrapper is configured to provide a mimic return value of the API functions indicating failure of the software component.

Optionally, said automatically wrapping comprises receiving from a user the mimic return value.

Optionally, the mimic return value is determined by analyzing a distribution of aggregated return values employed by a plurality of users.

Optionally, said automatically wrapping is configured to allow for selective partial disablement of the software component, wherein the function is a function of the operating system of the mobile computing device invoked by the software component when utilizing a predetermined functionality, wherein the wrapper is configured to disable invocation of the function by the software component, whereby preventing the software component from utilizing the predetermined functionality.

Optionally, the predetermined functionality is a privileged service of the operating system requiring permission.

Optionally, the predetermined functionality is a service of the operating system which is useful for ascertaining private information about a user of the mobile computing device.

Optionally, the predetermined functionality is selected from the group consisting of: network access, utilizing a positioning component of the mobile computing device, thread creation, accessing stored files on the mobile computing device, accessing contact information on the mobile computing device, accessing mail information on the mobile computing device, accessing calendar information on the mobile computing device, utilizing an accelerometer of the mobile computing device, utilizing a camera of the mobile computing device, utilizing a microphone the mobile computing device.

Optionally, configuration data of the modifiable configurations is stored locally on the mobile computing device and loaded to be used during execution of the application program.

Optionally, the modifiable configurations are modified by downloading an update of the configuration data to the mobile computing device from a server, wherein said downloading is initiated in response to the application program being launched.

Optionally, the modifiable configurations are modified by downloading an update of the configuration data to the mobile computing device from a server, wherein said downloading is performed in a non-blocking manner allowing the application program to continue execution, wherein the one or more wrappers are configured to determine whether the downloading has been completed and in case said downloading has not been completed, wait until the download is completed.

Optionally, the configuration data is modified by a provider of the application program.

Optionally, different configuration data is defined by the provider to be applied for different one or more parameters of the application program selected from the group consisting of: operating system version, application program version and geographical region.

Optionally, each wrapper is configured to record data pertaining invocation of the function, which data is used for monitoring the behavior of the software component during runtime of the application program.

Optionally, the function is a function of the operating system of the mobile computing device invoked by the software component when utilizing a predetermined functionality, wherein the data pertains the identity of the predetermined functionality.

Optionally, the function is a function of the operating system of the mobile computing device invoked by the software component when utilizing a predetermined functionality, wherein the data pertains the frequency of invocation of the function by the software component.

Another exemplary embodiment of the disclosed subject matter is a computerized apparatus having a processor, which processor is adapted to perform any of the above-mentioned steps.

Yet another exemplary embodiment of the disclosed subject matter is a computer program product comprising a computer readable storage medium retaining program instructions, which program instructions when read by a processor, cause the processor to perform any of the above-mentioned steps.

Yet another exemplary embodiment of the disclosed subject matter is a computer-implemented method comprising: displaying, by a server, a Graphical User Interface (GUI), to a user, wherein the GUI displays information regarding an application program for a mobile computing device, wherein the application program utilizes a software component that is integrated into the application program, wherein the GUI displays one or more enable/disable function buttons configured to indicate enablement or disablement of one or more functions associated with the software component; in response to a user interacting with the one or more enable/disable function buttons, updating modifiable configurations of the application program; distributing, by the server, the modifiable configurations to one or more mobile computing devices having the application program deployed thereon; whereby allowing for selectively enabling or disabling invocation of the one or more functions during runtime of the application program by modifying the modifiable configurations without re-deploying the application program on the one or more mobile computing devices.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to allow monitoring of and control over run-time behavior of a software component integrated in an application program ("app") for a mobile computing device.

One technical solution is to wrap one or more functions associated with the software component by one or more wrappers, wherein each wrapper is configured to selectively enable and disable invocation of the wrapped function during runtime of the application program based on modifiable configurations, without requiring re-deployment of the application program.

One technical effect of utilizing the disclosed subject matter is to allow for full or partial disablement of the integrated software component, by either preventing the software component from being utilized by the application program, or preventing the software component from utilizing certain services provided by the operating system.

In some exemplary embodiments, software components which exhibit malicious activity, such as abusing access granted to them, may be identified and blocked. In some cases, the disclosed subject matter may allow for partial disablement which would prevent the software component from performing the malicious activity while allowing the software component to continue functioning and provide a desired functionality. Additionally or alternatively, software components which exhibit malfunctions, such which may cause a "crash" of the application program, may be disabled partially or entirely. Users of the application program may not be interested in the source of the "crash" and instead may assume that the application program itself has bugs. As a result, malfunction of a software component may cause users to uninstall the application program and the provider of the application may lose users through no fault of his own. Similarly, a software component exhibiting behavior in violation of the terms and conditions enforced by online stores for application programs, such as App Store™ or Google Play™, may cause removal of the application program from the store. In some cases, malfunctions may be exhibited in specific configurations, such as specific operating system versions, specific devices, specific geographic location, or the like. The disclosed subject matter may provide the effect of overcoming the above-mentioned challenges, as well as other challenges.

Figure 1A:
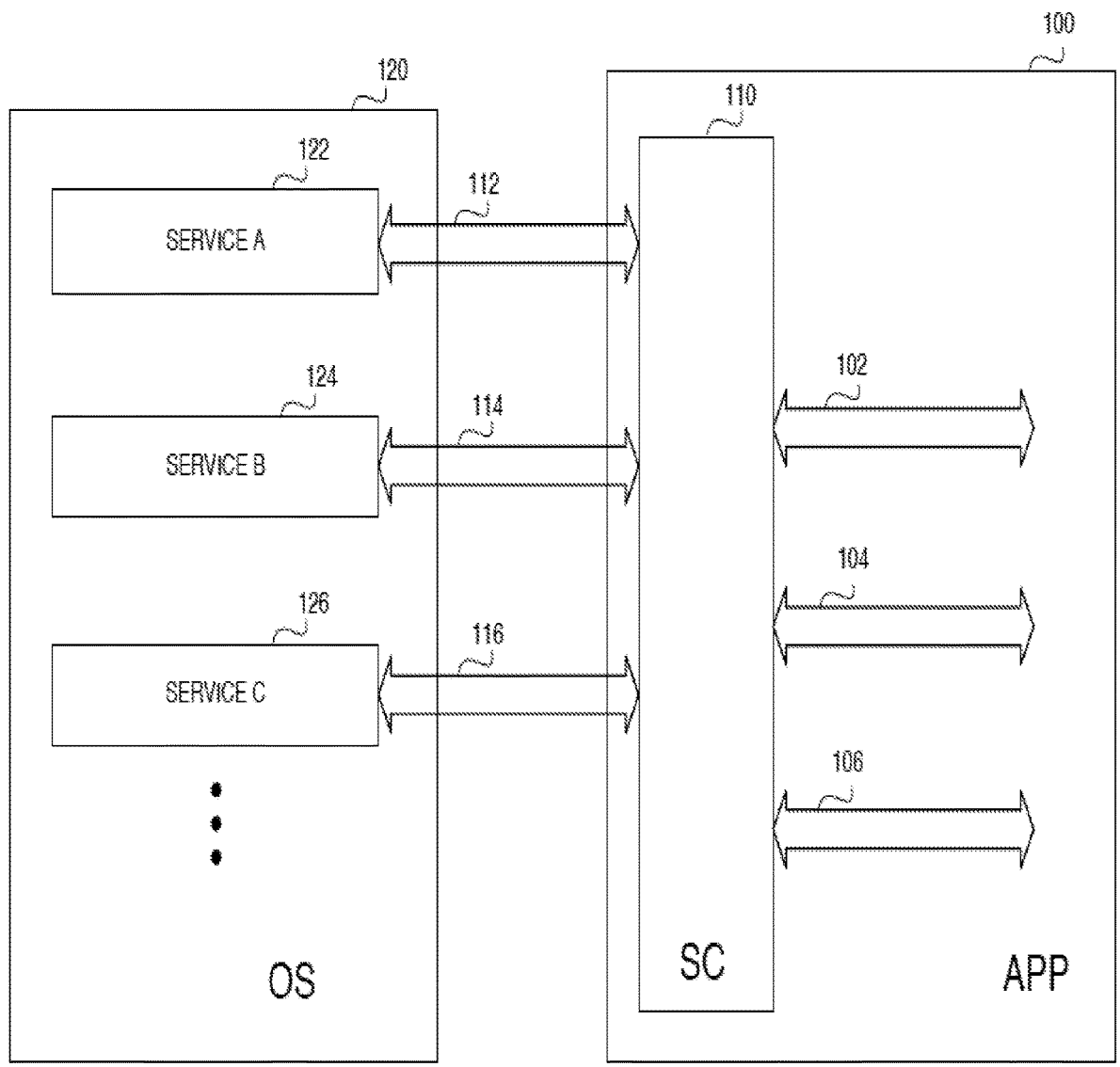
FIG. 1A shows a block diagram illustrating an application program having an integrated software component, in accordance with the prior art.

Referring now to FIG. 1A showing a block diagram illustrating an application program having an integrated software component, in accordance with the prior art.

A Software Component (SC) 110, integrated in an application program (App) 100 for a mobile computing device having an Operating System (OS) 120, may be utilized by App 100 through invocation of one or more functions of SC 110, such as functions 102, 104 and 106. SC 110, when utilized by App 100, may utilize one or more services of OS 120, such as Service A 122, Service B 124 and Service C 126, by invocation of respective Functions 112, 114 and 116 of OS 120.

Figure 1B:
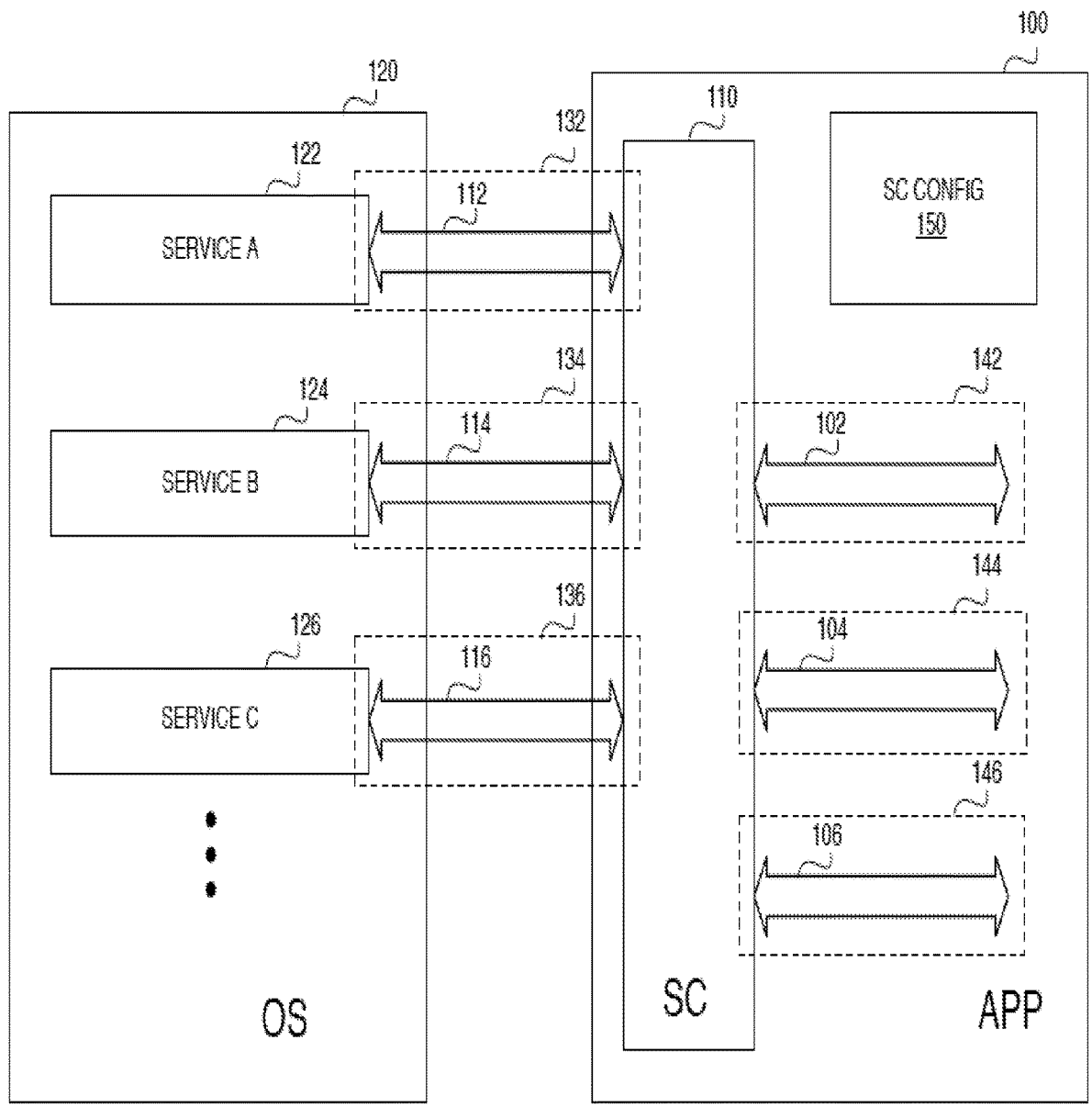
FIG. 1B shows a block diagram illustrating an application program having an integrated software component, in accordance with some exemplary embodiments of the disclosed subject matter.

Referring now to FIG. 1B showing a block diagram illustrating an application program having an integrated software component, in accordance with some exemplary embodiments of the disclosed subject matter.

In some exemplary embodiments, App 100 of FIG. 1A may be modified to include Wrappers 142, 144 and 146, wrapping invocation of respective Functions 102, 104 and 106 by App 100, and Wrappers 132, 134 and 136, wrapping invocation of respective Functions 112, 114 and 116 by SC 110. Wrappers 132, 134, 136, 142, 144 and 146 may be configured to selectively enable or disable invocation of respective Functions 112, 114, 116, 102, 104 and 106 during run-time of App 100, based on modifiable configurations (SC CONFIG) 150.

In some exemplary embodiments, Wrappers 132, 134, 136, 142, 144 and 146 may be configured to define substitute return values to mimic the return values of respective Functions 112, 114, 116, 102, 104 and 106 in case of disablement. For example, Wrapper 132 may be configured to define a substitute return value to mimic the return value of Function 112 in case that invocation of Function 112 is disabled by SC CONFIG 150, and to invoke Function 112 in case that invocation of Function 112 is enabled by SC CONFIG 150.

In some exemplary embodiments, SC 110 may be a Software Development Kit (SDK). In some exemplary embodiments, the SDK may be provided by a different developer than the developer of the application program.

In some exemplary embodiments, App 100 may have permissions authorized by a user of the mobile computing device to access privileged data. As an example, OS 120 may require permission to utilize positioning device such as GPS, access email data, access calendar or contact information of the mobile device, access photos, use microphone for recording audio, network access, or the like. When a user of App 100 grants any of these permissions to App 100, the permission may be automatically granted to SC 110 as well, as being integral part of App 100. SC 110 may be intended to utilize a portion of the permissions. In some cases, there may be declared permissions, such as in the documentation of SC 110, which may indicate which permissions are required and which permissions may be utilized if provided. Wrappers 132, 134, 136, 142, 144 and 146 may be configured to disable SC 110 entirely or disable a portion thereof by disabling one or more OS services from being utilized by SC 110. For example, in case the publisher of App 100 identifies that SC 110 maliciously or incorrectly use the permitted OS services, Wrappers 132, 134, 136, 142, 144 and 146 may disable SC 110 entirely or disable OS services that SC 110 utilizes maliciously or incorrectly from being further utilized by SC 110.

As an example, consider a navigation app which requires access to location services (e.g., GPS). The user may provide the navigation app with the suitable location permissions, which may also allow an SDK used by the navigation app to use the location services. OS 120 may not prevent the SDK, being integral part of the navigation app, from using the location services, thereby allowing the SDK to obtain location information which may be considered private and may be misused by the SDK. In some cases, an SDK may be a malicious SDK and may abuse such permissions even though the declared required permissions of the SDK may not include location services. Furthermore, the developer of the navigation app and/or the user of the navigation app may not be aware of the misuse of the SDK, as usage of the location services by the navigation app is permitted.

In some exemplary embodiments, Functions 102, 104 and 106 of SC 110 may be defined in an Application Program Interface (API) of SC 110. Wrappers 142, 144 and 146 may be configured to provide a mimic return value of the API functions indicating failure of SC 110, thereby allowing selective full disablement of SC 110. In some exemplary embodiments, App 100 may be a-priori configured to handle failure of SC 110. In some cases, App 100 may function even when SC 110 fails, such as the case may be with an SDK that is used to serve advertisements to App 100. In some exemplary embodiments, the mimic return value may be received from a user. In some further exemplary embodiments, the mimic return value may be automatically determined by analyzing a distribution of aggregated return values employed by a plurality of users, thereby automatically identifying a correct return value for each API function of each SDK in case of a full disablement. In some exemplary embodiments, a semi-automatic process may be used in which an automatic suggestion for a return value for each API function in case of full disablement is provided and the user either manually approves it or changes it.

In some exemplary embodiments, Wrappers 132, 134 and 136 may be configured to allow selective partial disablement of SC 110 by disabling invocation of one or more of the Functions 112, 114 and 116, whereby preventing SC 110 from utilizing one or more of the respective Services 122, 124 and 126 of OS 120.

In some exemplary embodiments, a service, such as Services 122, 124 and 126, may be a privileged service of OS 120 requiring permission. For example, Service A 122 may be access to files stored on the mobile computing device, such as photos, documents and the like, which may contain private information.

In some exemplary embodiments, a service, such as Service A 122, Service B 124 and Service C 126, may be a service of OS 120 which may be useful for ascertaining private information about a user of the mobile computing device. For example, Service B 124 may be utilization of a positioning component of the mobile computing device, from which geo-location data of the user may be determined.

In some exemplary embodiments, a service, such as Service A 122, Service B 124 and Service C 126, may be selected from the group consisting of: network access, utilizing a positioning component of the mobile computing device, thread creation, accessing stored files on the mobile computing device, accessing contact information on the mobile computing device, accessing mail information on the mobile computing device, accessing calendar information on the mobile computing device, utilizing an accelerometer of the mobile computing device.

In some exemplary embodiments, some OS services utilized by SC 110 may require permission to be utilized (e.g., access calendar information) while other services may not require any permission and may be used by any app executed by OS 120. As an example, in the Android™ operating system, any app can use the accelerometer of a mobile device without requiring any specific permission, while in order to access contact information, a specific permission needs to be granted to the app.

In some exemplary embodiments, configuration data of modifiable configurations (SC CONFIG) 150 may be stored locally on the mobile computing device and loaded to be used during execution of the application program. SC CONFIG 150 may be modified by downloading an update of the configuration data to the mobile computing device from a server. The downloading may be initiated in response to the application program being launched. Additionally or alternatively, the downloading may be initiated after a certain timeout, e.g. 24 hours.

In some exemplary embodiments, the downloading may be performed in a non-blocking manner allowing App 100 to continue execution. Wrappers 132, 134, 136, 142, 144 and 146 may be configured to determine whether the downloading has been completed and in case said downloading has not been completed, wait until the download is completed. Additionally or alternatively, in some cases, old configurations may be used during the beginning of the execution in order to avoid blocking execution of App 100 until the SC CONFIG 150 is updated. In some exemplary embodiments, the decision of whether to block App 100 may be based on a time elapsed since SC CONFIG 150 has started downloading (e.g., 1 second, 10 seconds, or the like), based on the last modification time of the current version of SC CONFIG 150 (e.g., one day old, a week old, or the like).

In some exemplary embodiments, configuration data of SC CONFIG 150 may be modified by a provider of application program App 100. In some further exemplary embodiments, different configuration data may be defined by the provider to be applied for different one or more parameters of the application program, for example, the version of OS 120, the version of App 100, the geographical region in which the mobile computing device is being used, and the like.

In some exemplary embodiments, Wrappers 132, 134, 136, 142, 144 and 146 may be configured to record data pertaining invocation of the respective Functions 112, 114, 116, 102, 104 and 106. The data may be used for monitoring the behavior of SC 110 during runtime of App 100. In some exemplary embodiments, the data may be pertained to the identity of a service of OS 120, such as Service A 122, Service B 124 and Service C 126, utilized by invocation of respective Functions 112, 114 and 116. In some further exemplary embodiments, the data may be pertained to the frequency, timing or other measurements related to invocation of a function of OS 120 such as Functions 112, 114 and 116. Additionally or alternatively, the monitored data of each SC 110 may be transmitted to a server (not shown) and aggregated from different instances of App 100 and of other applications which utilize SC 110. The monitored data may be analyzed and used to determine whether SC 110 misuses permissions, exhibits malicious functionality, or the like. For example, the frequency of invocation of a specific function or service of OS 120 by SC 110 during a current execution of App 100 may be compared to historic data of invocation frequencies measurements, or to invocation frequencies measured for other software components in a same or similar category. Additionally or alternatively, the frequency of invocation may be compared with a declaration of SC 110 as to which permissions are required by SC 110. In some cases, malicious behavior of SC 110 may be detected before run time by analyzing wrapped invocations of functions of OS 120 and comparing the same with services declared by SC 110 as utilized and requiring permission. In some cases, wrappers, such as 142, 144, 146, may track each time SC 110 is invoked and each time SC 110 finishes its operation. In case SC 110 crashes during its operation, an invocation may not be accompanied by a corresponding indication of finishing operation. By tracking such information, preferably in an aggregated manner, crashes of SC 110 may be identified. Developers may be alerted about any suspicious behavior of SC 110 and invited to take necessary measures or precautions. Suggestions may be provided to developers to avoid using a certain software component or to deactivate software components. In some cases, the suggestion may be to deactivate SC 110 for all deployed instances of App 100. Additionally or alternatively, the suggestion may be to deactivate SC 110 to only some deployed instances in which crashes were identified, such as based on OS 120 version, App 100 version, geographical region, locale information of the executing mobile phone, or the like.

Figure 2A:
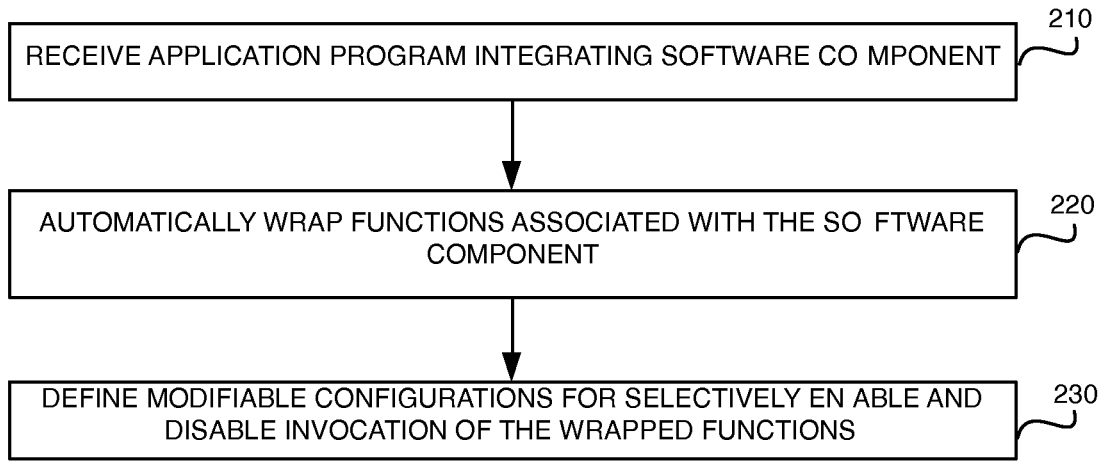
FIG. 2A shows a flowchart diagram of a method, in accordance with some exemplary embodiments of the disclosed subject matter.

Referring now to FIG. 2A showing a flowchart diagram of a method in accordance with some exemplary embodiments of the disclosed subject matter.

On Step 210, an application program for a mobile computing device, such as App 100 of FIGS. 1A and 1B, integrating a software component, such as SC 110 of FIGS. 1A and 1B, may be received. In some exemplary embodiments, source code of the software component may or may not be available. In some exemplary embodiments, source code of the application program may or may not be available.

In some exemplary embodiments, Step 210 may include parsing of the application program to identify software component candidates. A list of all candidates may be displayed to a user. In some cases, the list may be sent to a server for validation prior to displaying the list to the user, thereby allowing for an additional filtering which may be based on history and manual configurations. The developer may select which of the software components he would like to wrap in order to monitor and control.

On Step 220, one or more functions associated with the software component may be automatically wrapped by one or more wrappers, such as Wrappers 132, 134, 136, 142, 144 and 146 of FIG. 1B. In some exemplary embodiments, the one or more functions may be functions invoked by the application program for utilizing the software component, such as 102, 104 and 106 of FIGS. 1A and 1B. In some exemplary embodiments, the one or more functions may be functions of the operating system of the mobile computing device, such as 112, 114 and 116 of FIGS. 1A and 1B, invoked by the software component for utilizing a predetermined functionality, such as Service A 122, Service B 124 and Service C 126 of FIGS. 1A and 1B.

In some exemplary embodiments, on Step 220 the code or binary file of application program may be parsed to identify invocations of the API of software component and such invocations may be wrapped. Similarly, the code or executable of the software component may be parsed to identify usages of the services of the operating system. Such usages may be wrapped.

In some exemplary embodiments, wrapping may be performed by replacing a call to the API or OS service with a call to the wrapper which performs additional functionality in addition to calling the API or OS service, respectively. Additionally or alternatively, aspect-oriented programming, such as AspectJ™, may be utilized to define cross-cutting wrapping functionality in a relatively easy to maintain manner. Additionally or alternatively, wrapping may be performed using code instrumentation to either an executable file or to source code.

In some exemplary embodiments, wrappers may be configured to return a dummy return value which mimics the return value of the OS service or API. The dummy return value may be used for disabling an operation. In some cases, the dummy return value may be a fictitious value, e.g. fictitious contact, empty contact list, empty list of event, or fictitious location data, in case the invoking entity is not permitted to access the actual data. In some cases, the dummy return value may be an error value which the invoking entity should be configured to handle (e.g., avoid using the software component, if possible, or the like). In some cases, dummy values of OS services may be a-priori known, such as based on documentation of the OS. Additionally or alternatively, dummy values of an API of a software component may be defined by a developer, which may rely on documentation of the software component. Additionally or alternatively, dummy values may be ascertained automatically from a plurality of manual definitions by different developers integrating the same software component. In some exemplary embodiments, automatic suggestion may be provided for the developer and the developer may accept such suggestion or provide a different value instead.

On Step 230, modifiable configurations, such as SC CONFIG 150 of FIG. 1B, are defined for selectively enable and disable invocation of the wrapped functions. The modifiable configurations may be retained in a server and transmitted to computing devices in which the app is executed. In some exemplary embodiments, an initial configuration may be defined and the developer may modify it over time.

Figure 2B:
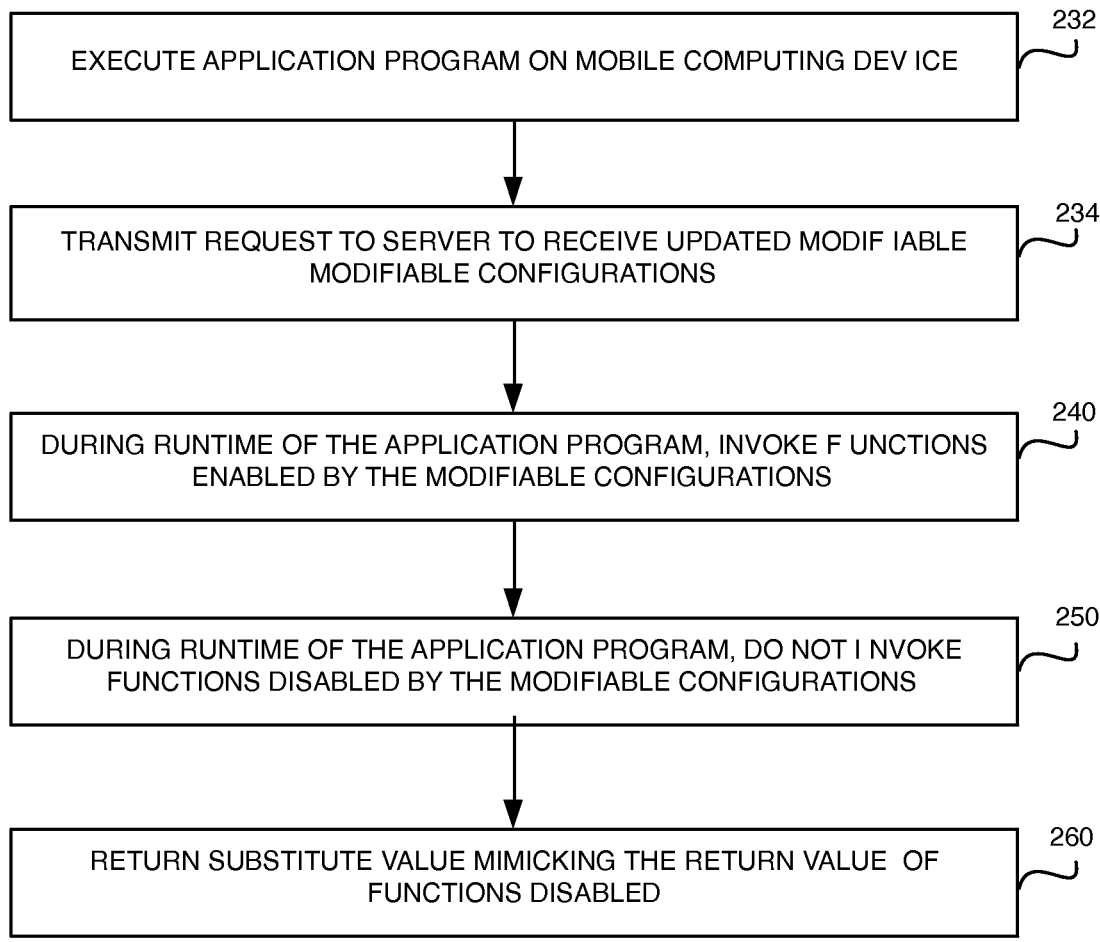
FIG. 2B shows a flowchart diagram of a method, in accordance with some exemplary embodiments of the disclosed subject matter.

Referring now to FIG. 2B showing a flowchart diagram of a method in accordance with some exemplary embodiments of the disclosed subject matter.

On Step 232, the application program ("app") is being executed on a mobile computing device. The app may have been downloaded to the mobile computing device from a network, such as the Internet. The app may be retained by servers serving apps to mobile devices. In some exemplary embodiments, the app may be downloaded by a user of the mobile computing device by accessing a digital app store and selecting the app from the app store.

On Step 234, after the app is invoked, the app may transmit a request to a server to receive updated modifiable configurations. In case there are modifiable configurations that are retained locally on the mobile computing device and they are up to date, no update may be performed. Additionally or alternatively, in case a modification is required, the device may download the modifiable configuration from the network. In some exemplary embodiments, the downloading may be performed in a non-blocking manner. In some exemplary embodiments, in case there is no network available, default or previous configurations may be used. If previous configurations is considered "recent" (e.g., last 24 hours, last 7 days, etc.), the previous configurations may be used.

On Step 240, during runtime of the application program, if invocation of a function of the one or more wrapped functions is enabled by the modifiable configurations, the function may be invoked by the respective wrapper and return the same value as the original function returns. In some cases, the downloading of modifiable configurations may not end by the time it is required. In some exemplary embodiments, the app may wait until the modifiable configurations are downloaded. Additionally or alternatively, a timeout may be imposed to prevent undesired blocking of the program. Different timeouts may be employed to different threads of the app, such as a shortened timeout for a User Interface (UI) thread (e.g., 0.5 second) than for other threads (e.g., 2 seconds).

On Step 250, during runtime of the application program, if invocation of a function of the one or more wrapped functions is disabled by the modifiable configurations, the function may not be invoked by the respective wrapper. A substitute return value mimicking the return value of the function may be returned by the respective wrapper (Step 260).

Figure 3:
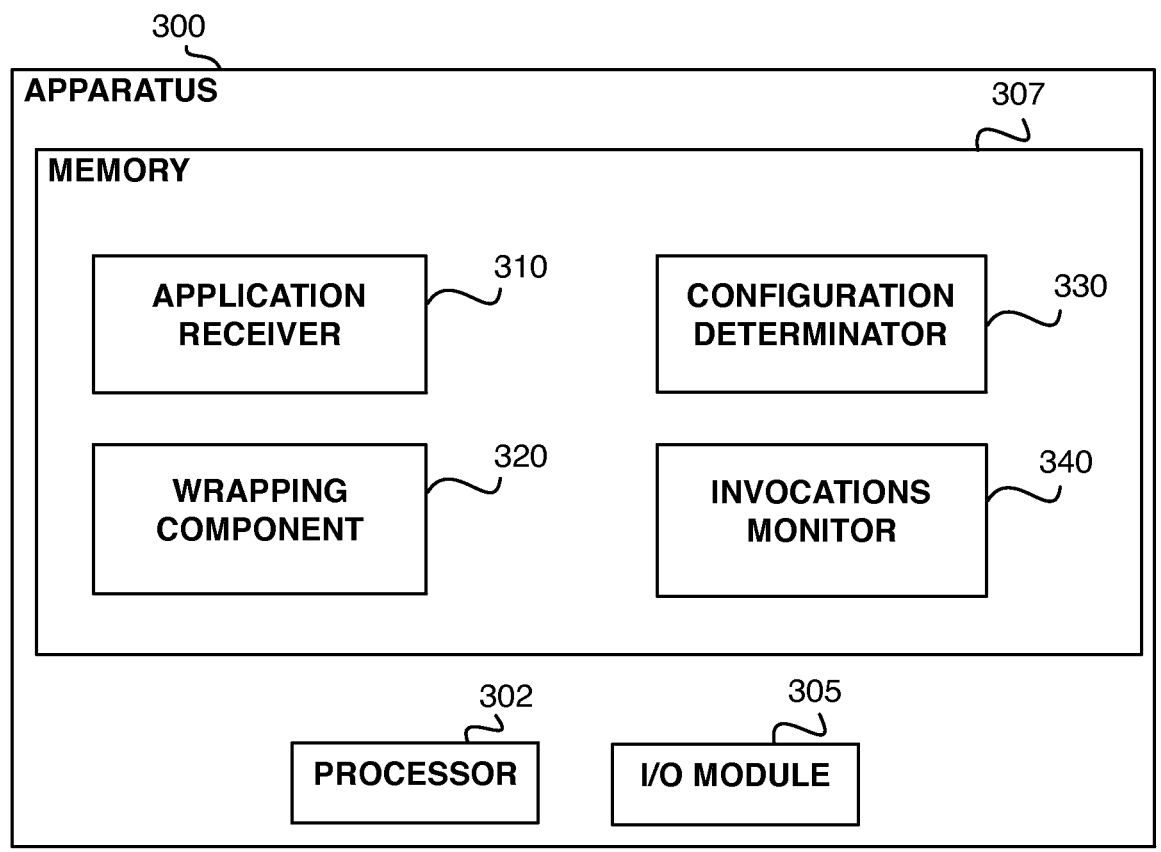
FIG. 3 shows a block diagram of an apparatus, in accordance with some exemplary embodiments of the disclosed subject matter.

Referring now to FIG. 3 showing an apparatus in accordance with some exemplary embodiments of the disclosed subject matter.

Apparatus 300 may comprise one or more Processors 302. Any of Processors 302 may be a Central Processing Unit (CPU), a microprocessor, an electronic circuit, an Integrated Circuit (IC) or the like. Alternatively, Apparatus 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 302 may be utilized to perform computations required by Apparatus 300 or any of it subcomponents.

Apparatus 300 may comprise an Input/Output (I/O) Module 305. I/O Module 305 may be utilized to provide an output to and receive input from a user.

Apparatus 300 may comprise a Memory 307 for storing executable components, which may also contain data during execution of one or more components. Memory 307 may be persistent or volatile. For example, Memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory 307 may retain program code operative to cause any of Processors 302 to perform acts associated with any of the steps shown in FIG. 2 above, for example wrapping functions associated with a software component integrated in an application program, defining modifiable configurations for selectively enable and disable invocation of the wrapped functions, or others.

The components detailed below may be implemented as one or more sets of interrelated computer instructions, executed for example by any of Processors 302 or by another processor. The components may be arranged as one or more executable files, dynamic libraries, static libraries, methods, functions, services, or the like, programmed in any programming language and under any computing environment.

Memory 307 may comprise an Application Receiver 310 for receiving an application program for a mobile computing device, the application program having an integrated software component intended to be utilized by the application program through invocation of one or more functions of the software component. The application program may be received via a communication means such as the Internet, through a communication line, from another memory component, or the like. In some exemplary embodiments, Application Receiver 310 may be coupled with a plug-in for installation in a development environment of a provider of the application program.

Memory 307 may comprise a Wrapping Component 320 for modifying the application program by automatically wrapping one or more functions associated with the software component with one or more wrappers configured for selectively enabling and disabling invocation of the wrapped functions based on modifiable configurations. Wrapping Component 320 may configure each of the one or more wrappers to define a substitute return value to mimic the return value of the wrapped function in case that invocation of the wrapped function is disabled, and to invoke the wrapped function in case that invocation of the wrapped function is enabled. In some exemplary embodiments, Wrapping Component 320 may configure each of the one or more wrappers to record data pertaining invocation of the wrapped function to allow monitoring utilization of wrapped function.

Memory 307 may comprise a Configuration Determinator 330 for determining configuration data of the modifiable configurations. The configuration data may be stored locally on the target mobile computing device in which the application program being installed and loaded by Configuration Determinator 330 to be used during execution of the application program. Configuration Determinator 330 may be coupled to a server from which an update to the configuration data may be downloaded. I/O Module 305 may comprise a graphical user interface coupled to Configuration Determinator 330 allowing modification of the configuration data by a user, for example a provider of the application program. Configuration Determinator 330 may be configured to determine different configuration data applying to different one or more parameters of the application program, for example, operating system version, application program version, geographical region and the like.

Memory 307 may comprise an Invocations Monitor 340 for monitoring invocations of wrapped functions by the software component during runtime of the application program, based on data recorded by the one or more wrappers as configured by Wrapping Component 320. Invocations Monitor 340 may monitor the identity of the functions being invoked. Additionally or alternatively, Invocations Monitor 340 may monitor the frequency of invocation of one or more functions.

Figure 4:
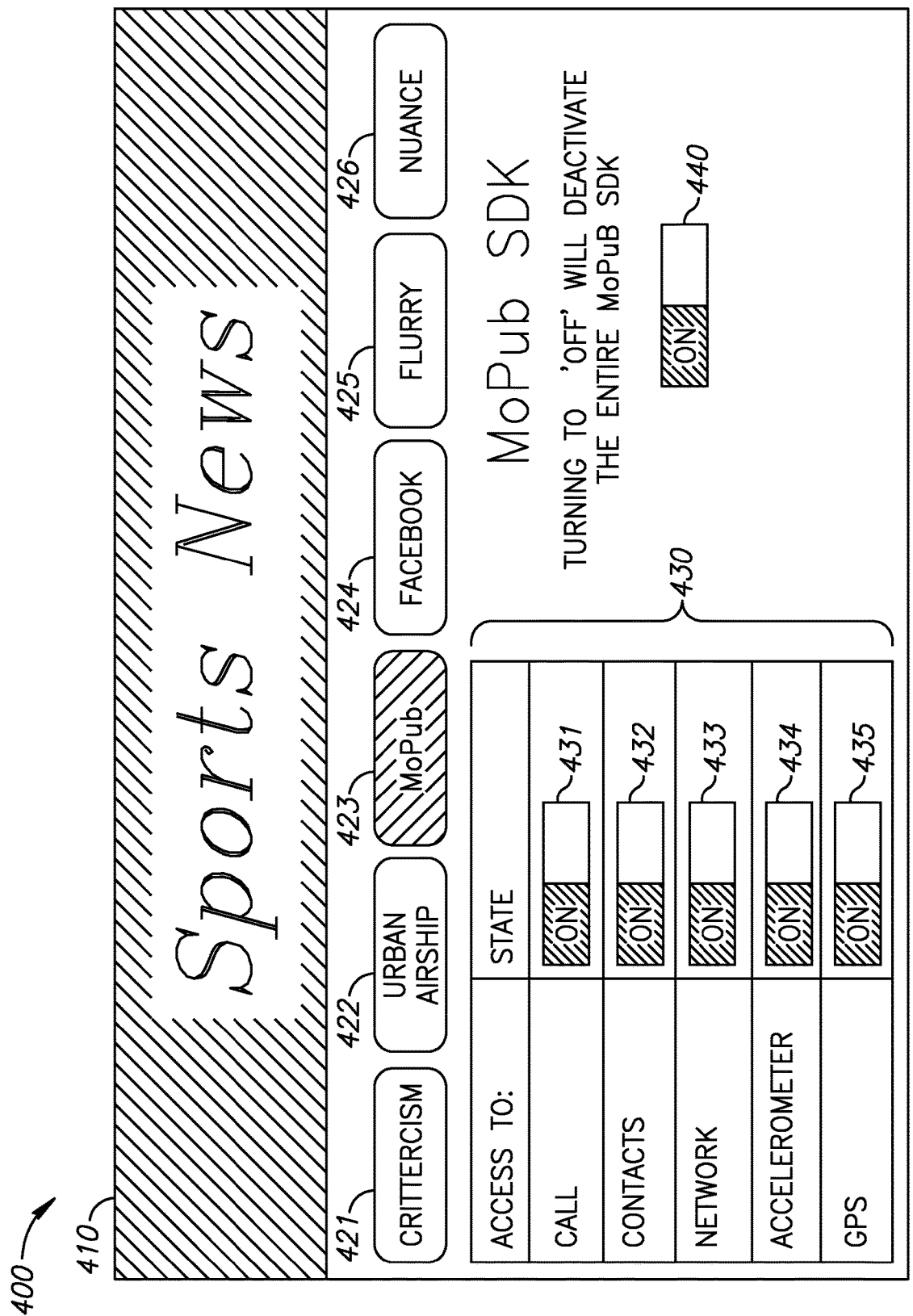
FIG. 4 shows a block diagram of a graphical user interface for configuring software components integrated in an application program, in accordance with some exemplary embodiments of the disclosed subject matter.

Referring now to FIG. 4 showing a block diagram of a graphical user interface for configuring software components integrated in an application program, in accordance with some exemplary embodiments of the disclosed subject matter.

Graphical User Interface (GUI) 400 may comprise a Title Section 410 for displaying a title identifying the application program having one or more configurable software components integrated therein, which software components may be displayed and configured using GUI 400. In some exemplary embodiments, GUI 400 may allow a user to interact with a server retaining the modifiable configurations. In case the user modifies the modifiable configurations, the server may distribute the modifiable configurations to devices on which the relevant app is installed. In some exemplary embodiments, the distribution may occur as a result of execution of the app, which may query the server for an updated modifiable configurations file.

GUI 400 may comprise Selection Buttons 421, 422, 423, 424, 425 and 426 allowing a user to select a configurable integrated software component for display and configuration of associated modifiable configurations by GUI 400. For example, as depicted in FIG. 4, Sports News app (as identified in Title Section 410) contains six different integrated software components: CRITTERCISM™ (421), which may be useful for monitoring app performance and providing trending information; URBAN AIRSHIP™ (422), which may be useful for performing A/B testing, for providing conversion analytics, and for delivering interactive push notifications; MOPUB™ (423), which may be used to provide personalized in-app advertisements; FACEBOOK™ (424) which may allow the app to interact with the FACEBOOK™ social network, such as perform login using FACEBOOK™ credentials, post and share posts, or the like; FLURRY™ (425) which may provide mobile app analytics including user engagement measurements; and NUANCE™ (426) which may provide speech recognition abilities to the app.

GUI 400 may comprise a Services Configuration Panel 430 for displaying and configuring modifiable configurations of predetermined services utilized by the selected software component. Services Configuration Panel 430 may comprise Enable/Disable Service Buttons 431, 432, 433, 434 and 435 allowing a user to enable and disable utilization of one or more services by the software component. Enable/Disable Service Buttons 431, 432, 433, 434 and 435 may be switchable between "ON" and "OFF" state to allow enablement and disablement of the associated service respectively.

GUI 400 may comprise an Enable/Disable Component Button 440 allowing a user to enable and disable the software component from being invoked by the application program. Enable/Disable Component Button 440 may be switchable between "ON" and "OFF" state to allow enablement and disablement of the software component respectively.

In some exemplary embodiments, GUI 400 may indicate parameters of the application program for filtering instances of the application program to which the enable/disable configuration is relevant. In some exemplary embodiments, the GUI 400 may allow for selection of an operating system name or version for which the configuration is applied, selection of a version of the application program, a selection of geographical region, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    receiving an application program for a mobile computing device, wherein the application program utilizes a software component that is integrated into the application program;
    producing a modified application program based on the application program, wherein said producing comprises:
        automatically wrapping one or more functions associated with the software component with one or more wrappers, wherein each wrapper of the one or more wrappers is associated with a function of the one or more functions, wherein the wrapper is configured to selectively disable or enable invocation of the function based on modifiable configurations, wherein the modifiable configurations are provided by a developer of the application program to determine enablement/disablement status of the one or more functions, wherein each wrapper is configured to define a substitute return value to mimic a return value of the function in case the invocation of the function is disabled, wherein each wrapper is configured to invoke the function in case the invocation of the function is enabled;

whereby allowing for the developer of the application program to selectively enable or disable invocation of the one or more functions during runtime of the application program on the mobile computing device, by modifying the modifiable configurations without re-deploying the application program, regardless of whether the software component originated from the developer or a third-party developer, wherein the mobile computing device is not controlled by the developer.

2. The computer-implemented method of claim 1, wherein the software component is a Software Development Kit (SDK) provided by a different developer than a developer of the application program.

3. The computer-implemented method of claim 1, wherein the application program has permissions authorized by a user of the mobile computing device to access privileged data, wherein the permissions are enforced by an operating system of the mobile computing device, wherein the operating system enforces the permissions uniformly on the application program and the software component, wherein the software component is intended to utilize a portion of the permissions, wherein each wrapper of the one or more wrappers is configured to allow disabling of the software component or portion thereof in case the software component utilizes more than the portion of the permissions.

4. The computer-implemented method of claim 1, wherein the software component is a Software Development Kit (SDK) provided by a different provider than the developer of the application program, wherein said automatically wrapping is configured to allow for selective full disablement of the SDK, wherein the one or more functions are functions defined in an Application Program Interface (API) of the SDK invoked by the application program when utilizing the SDK, wherein each wrapper of the one or more wrappers is configured to provide a mimic return value of the API functions indicating failure of the SDK.

5. The computer-implemented method of claim 4, wherein said automatically wrapping comprises receiving from a user the mimic return value.

6. The computer-implemented method of claim 4, wherein the mimic return value is determined by analyzing a distribution of aggregated return values employed by a plurality of users.

7. The computer-implemented method of claim 1, wherein said automatically wrapping is configured to allow for selective partial disablement of the software component, wherein the function is a function of an operating system of the mobile computing device invoked by the software component when utilizing a predetermined functionality, wherein each wrapper of the one or more wrappers is configured to disable invocation of the function by the software component, whereby preventing the software component from utilizing the predetermined functionality.

8. The computer-implemented method of claim 7, wherein the predetermined functionality is a privileged service of the operating system requiring permission.

9. The computer-implemented method of claim 7, wherein the predetermined functionality is a service of the operating system which is useful for ascertaining private information about a user of the mobile computing device.

10. The computer-implemented method of claim 7, wherein the predetermined functionality is selected from the group consisting of: network access, utilizing a positioning component of the mobile computing device, thread creation, accessing stored files on the mobile computing device, accessing contact information on the mobile computing device, accessing mail information on the mobile computing device, accessing calendar information on the mobile computing device, utilizing an accelerometer of the mobile computing device, utilizing a camera of the mobile computing device, utilizing a microphone the mobile computing device.

11. The computer-implemented method of claim 1, wherein configuration data of the modifiable configurations is stored locally on the mobile computing device and loaded to be used during execution of the application program.

12. The computer-implemented method of claim 11, wherein the modifiable configurations are modified by downloading an update of the configuration data to the mobile computing device from a server, wherein said downloading is initiated in response to the application program being launched.

13. The computer-implemented method of claim 11, wherein the modifiable configurations are modified by downloading an update of the configuration data to the mobile computing device from a server, wherein said downloading is performed in a non-blocking manner allowing the application program to continue execution, wherein the one or more wrappers are configured to determine whether the downloading has been completed and in case said downloading has not been completed, wait until the download is completed.

14. The computer-implemented method of claim 11, wherein the configuration data is modified by the developer of the application program.

15. The computer-implemented method of claim 14, wherein different configuration data is defined by the developer to be applied for different one or more parameters of the application program selected from the group consisting of: operating system version, application program version and geographical region.

16. The computer-implemented method of claim 1, wherein each wrapper is configured to record data pertaining invocation of the function, which data is used for monitoring a behavior of the software component during runtime of the application program.

17. The computer-implemented method of claim 16, wherein the function is a function of an operating system of the mobile computing device invoked by the software component when utilizing a predetermined functionality, wherein the data pertains to an identity of the predetermined functionality.

18. The computer-implemented method of claim 16, wherein the function is a function of an operating system of the mobile computing device invoked by the software component when utilizing a predetermined functionality, wherein the data pertains to a frequency of invocation of the function by the software component.

19. A computer program product comprising a computer readable storage medium retaining program instructions, which program instructions when read by a processor, cause the processor to perform:
    receiving an application program for a mobile computing device, wherein the application program utilizes a software component that is integrated into the application program;
    producing a modified application program based on the application program, wherein said producing comprises:
        automatically wrapping one or more functions associated with the software component with one or more wrappers, wherein each wrapper of the one or more wrappers is associated with a function of the one or more functions, wherein the wrapper is configured to selectively disable or enable invocation of the function based on modifiable configurations, wherein the modifiable configurations are provided by a developer of the application program to determine enablement/disablement status of the one or more functions, wherein each wrapper is configured to define a substitute return value to mimic a return value of the function in case the invocation of the function is disabled, wherein each wrapper is configured to invoke the function in case the invocation of the function is enabled;

whereby allowing for the developer of the application program to selectively enable or disable invocation of the one or more functions during runtime of the application program on the mobile computing device by modifying the modifiable configurations without re-deploying the application program, regardless of whether the software component originated from the developer or a third-party developer, wherein the mobile computing device is not controlled by the developer.

20. A computer-implemented method comprising:

displaying, by a server, a Graphical User Interface (GUI), to a developer of an application program for a mobile computing device, wherein the GUI displays information regarding the application program, wherein the application program utilizes a software component that is integrated into the application program, wherein the GUI displays one or more enable/disable function buttons configured to indicate enablement or disablement of one or more functions associated with the software component;

in response to the developer of the application program interacting with the one or more enable/disable function buttons, updating modifiable configurations of the application program to determine enablement/disablement status of the one or more functions;

distributing, by the server, the modifiable configurations to a plurality of mobile computing devices having the application program deployed thereon;

whereby allowing for the developer of the application program to selectively enable or disable invocation of the one or more functions during runtime of the application program on the mobile computing device by modifying the modifiable configurations without re-deploying the application program on the plurality of mobile computing devices, regardless of whether the software component originated from the developer or a third-party developer, wherein the mobile computing device is not controlled by the developer.

21. A computerized apparatus having a hardware processor coupled with a memory device, wherein the memory device retaining the computer program product of claim 19.

* * * * *